Nov. 21, 1944.  R. S. CONDON ET AL  2,363,230
VISE
Filed Dec. 9, 1942    2 Sheets-Sheet 1
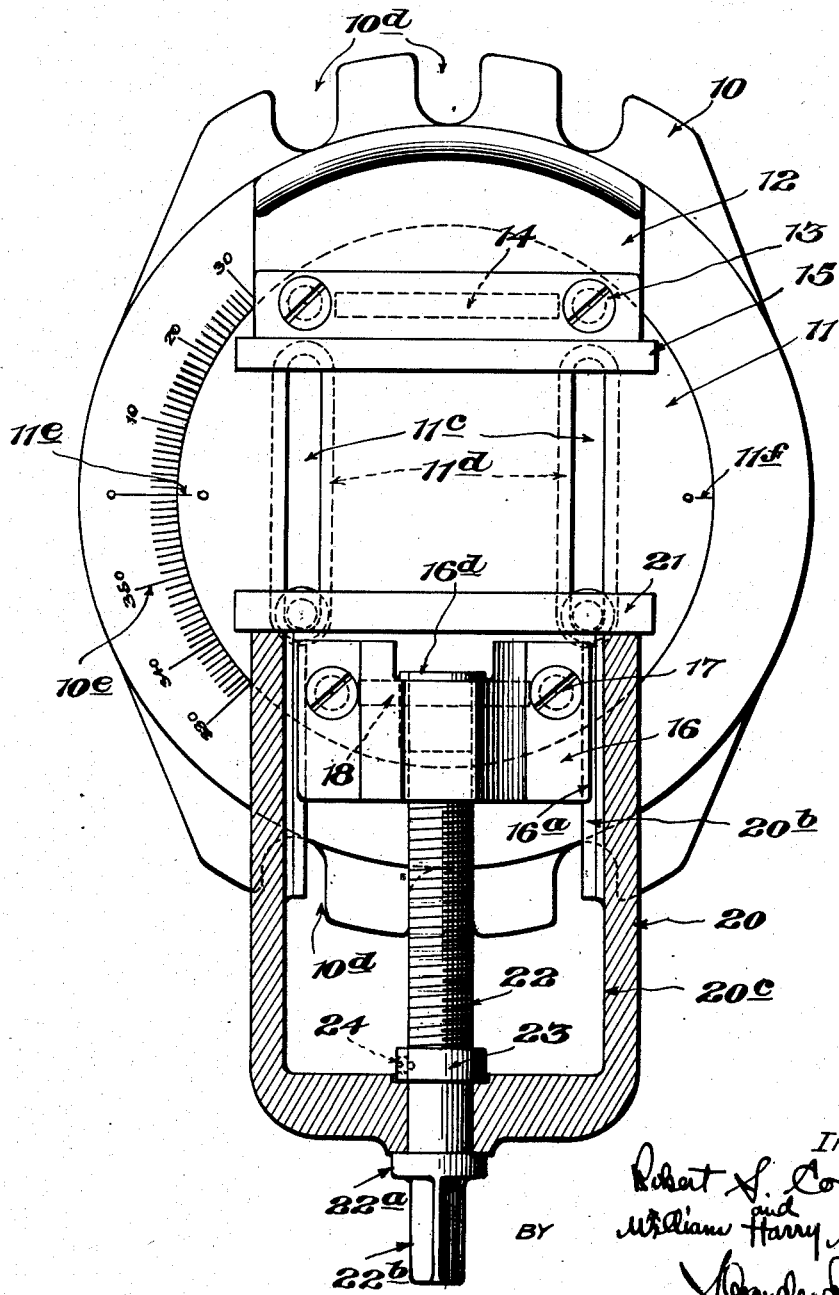

Nov. 21, 1944. R. S. CONDON ET AL 2,363,230
VISE
Filed Dec. 9, 1942 2 Sheets-Sheet 2
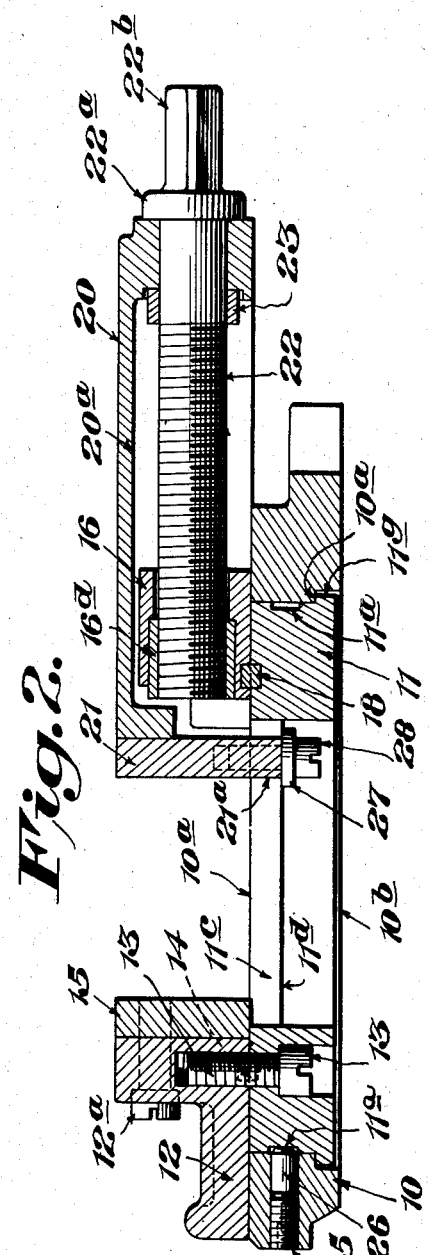
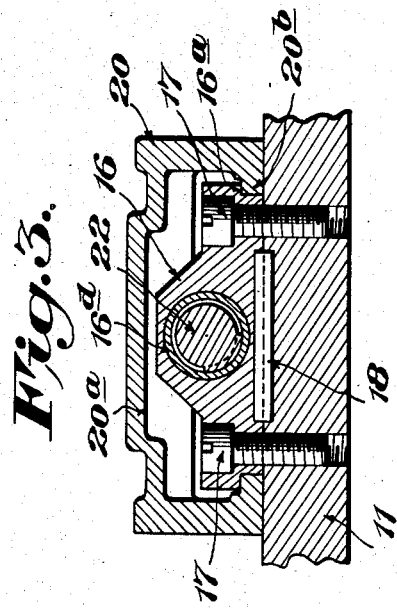
Inventors
Robert S. Condon
and
William Harry Williams
By Alexander Dowell
Attorneys Patented Nov. 21, 1944

2,363,230

UNITED STATES PATENT OFFICE 2,363,230

VISE

Robert S. Condon, Rutland, and William Harry Williams, Poultney, Vt.

Application December 9, 1942, Serial No. 468,402

19 Claims. (Cl. 90—60)

Our invention relates to a mechanical vise particularly adapted for use in holding work pieces upon the tables of milling machines and other machine tools; and the principal object of our invention is to provide gripping jaws for holding such work pieces securely at any angle and at a particularly advantageous short distance from said tables.

Another object of our invention is to provide a novel swivel mounting for the gripping jaws of the vise whereby the action of clamping the jaws together also contributes to further clamping of the swivel mounting to prevent the rotation of the workpiece while being held by the gripping jaws.

A further object of our invention is to provide protection for the clamping screw against fouling from chips and dirt.

A still further object of our invention is to reduce the lifting of the sliding jaw to a minimum when it is forced into clamping position by providing novel and efficient means for holding the said jaws down on the jaw plate itself.

We will explain the invention with reference to the accompanying drawings which illustrate several practical embodiments thereof to enable others familiar with the art to adopt and use the same; and will summarize in the claims the essential features of the invention, the novel features of construction, and novel combinations of parts, for which protection is desired.

In said drawings:

Fig. 1 is a top plan view of the vise with the sliding jaws shown partly in cross-section.

Fig. 2 is a longitudinal cross-section through the vise.

Fig. 3 is a transverse section through the sliding jaw bracket and the nut bracket.

In the drawings, 10 represents the vise base ring which is fitted with the swivel plate 11. Fixed jaw 12 is securely bolted to swivel plate 11 by screws 13 and key 14, and is fitted with fixed jaw plate 15 that is secured to it by screws 12a as shown in Fig. 2. A nut bracket 16 is also secured to swivel plate 11 by screws 17 and key 18. This nut bracket 16 is machined with an overhanging shoulder 16a to guide and hold down shoulder 20b and thus hold down sliding jaw bracket 20. Sliding jaw plate 21 is secured to sliding jaw bracket 20 by means of screws (not shown) but in a manner similarly to screws 12a which secure fixed jaw plate 15 to jaw 12. A screw shaft 22 is journaled in sliding jaw bracket 20 and held against axial movement by a collar 23 thereon which in turn is secured by a set screw 24. Screw shaft 22 is threaded into the nut bracket 16.

Fig. 2 shows the nut bracket 16 fitted with an optional inserted nut 16d non-rotatably secured into position in the bracket 16. This inserted nut 16d is necessary only where a particular material is required for this nut. However the nut bracket 16 could obviously be itself tapped to receive screw shaft 22.

The rotation of screw shaft 22 moves sliding jaw bracket 20 since the shoulder 22a and collar 23 permit free rotation of the screw shaft 22 in bracket 20 and screw shaft 22 follows the threads in nut bracket 16 or nut 16d. The screw shaft is rotated by means of a suitable wrench or crank gripping the flattened end 22b of the screw shaft 22.

The workpieces (not shown) which are held between fixed jaw plate 15 and sliding jaw plate 21 are held very close to the work table because surface 10a is particularly close to surface 10b which directly contacts the table; and while the workpieces are thus held close to the work table the vise jaws can be swiveled to any angle since both vise jaws 12 and 20 are mounted on swivel plate 11.

A clamping screw 25 (Fig. 2) in base ring 10 is adapted to force a plug 26 securely into an annular groove 11a in swivel plate 11 to prevent rotation of the swivel plate in the vise base ring 10. Swivel plate 11 however is further prevented from rotation when vise jaws 12 and 20 are clamped together because the reaction from such clamping action forces these vise jaws down against base ring 10 and also tends to lift swivel plate 11 so that a shoulder 11g on swivel plate 11 presses securely against a shoulder 10c of base ring 10. When clamping screw 25 is loosened, plug 26 is released and therefore slides freely in groove 11a in swivel plate 11 so that the latter is free to rotate in vise base ring 10 if the vise jaws 12 and 20 are not clamped against each other.

Sliding jaw bracket 20 is closed at its top, as at 20a, to strengthen this bracket and to form a shield to prevent chips and dirt from fouling the screw shaft 22.

Sliding jaw plate 21, as shown in Fig. 2, is provided with projections 21a which fit in parallel slots 11c in swivel plate 11 which guide them. Collars 27 are secured upon projections 21a by means of screws 28 and these collars 27 slide against the shoulders 11d in swivel plate 11 and prevent upward lifting movement of sliding jaw 21.

The slots or flutings 10d in base ring 10 are adapted to receive the bolts that hold the base ring 10 down upon the machine tool table or other surface upon which this vise is to be mounted.

Base ring 10 is calibrated as at 10e, which calibrations may be continued around the entire inner periphery to cooperate with zero marks 11e or 11f on the swivel plate 11 to indicate the particular angularity of the vise swivel position.

Sliding jaw bracket 20 may be readily assembled in the vise by lowering that portion of sliding jaw bracket 20 shown at 20c over nut bracket 16 before the jaws 15 and 21, screw 22, and collar 23 are in position.

We do not limit our invention to the exact forms shown in the drawings for obviously changes may be made therein within the scope of the claims.

We claim:

1. A vise, comprising an annular base ring having an internal annular shoulder; a swivel plate disposed within the base ring having an external annular shoulder and having parallel guide slots therein engaging the first named shoulder; a fixed jaw on the swivel plate; a bracket on the swivel plate; said jaw and bracket positioning the swivel plate in the ring while permitting free rotation of the plate therein; a sliding jaw slidably mounted on the bracket and having projections entering said parallel guide slots; and means for shifting the sliding jaw on the bracket.

2. In a vise as set forth in claim 1, a sliding jaw bracket carrying the sliding jaw, said bracket being completely closed at its top surface to prevent fouling of the jaw shifting means by dirt and chips.

3. In a vise as set forth in claim 1, said parallel guide slots being of T-shaped cross-section; and the said projections of the sliding jaw having enlargements engaging the shoulders of said T-slots to prevent lifting of the sliding jaw during clamping operations.

4. In a vise as set forth in claim 1, adjustable clamping means in the ring adapted to engage the swivel plate to prevent rotation of the latter; and said fixed jaw and bracket overlapping the base ring and forming a secondary clamping means due to reaction of the clamping pressure binding the fixed jaw and bracket down against the base ring, said reaction also drawing the shoulder of the swivel plate up against the shoulder of the base ring.

5. In a vise as set forth in claim 1, said bracket carrying a non-rotatable nut; and said means for shifting the sliding jaw comprising a screw shaft journaled in the sliding jaw and engaging the said nut; said screw shaft having a wrench engaging extension projecting beyond the sliding jaw maintained at a constant requisite minimum.

6. In a vise of the character specified, an annular base ring; a swivel plate rotatably mounted within said ring; a fixed jaw on the swivel plate; a bracket on the swivel plate; a sliding jaw bracket slidably mounted on the first bracket; a sliding jaw carried by said sliding jaw bracket; means for shifting the sliding jaw on the nut bracket; and said sliding jaw bracket being completely closed at its top surface to prevent fouling of the jaw shifting means by dirt and chips.

7. In a vise as set forth in claim 6, adjustable clamping means in the ring adapted to engage the swivel plate to prevent rotation of the latter.

8. In a vise as set forth in claim 6, said first named bracket carrying a non-rotatable nut; and said means for shifting the sliding jaw comprising a screw shaft journaled in the sliding jaw bracket and engaging the said nut; said screw shaft having a wrench engaging extension projecting beyond the sliding jaw maintained at a constant requisite maximum.

9. In a vise as set forth in claim 6, said first named bracket having parallel guides; and said sliding jaw bracket having cooperating guides engaging the first mentioned guides.

10. In a vise of the character specified, an annular base ring having an internal annular shoulder; a swivel plate within the base ring having an external annular shoulder engaging the shoulder of the ring; a fixed jaw on the swivel plate; a bracket on the swivel plate; a sliding jaw bracket slidably mounted on the first bracket; a sliding jaw carried by said sliding jaw bracket and having projections carrying heads entering parallel T-slots in the swivel plate to prevent lifting of the sliding jaw during clamping operations; and means for shifting the sliding jaw on the first bracket.

11. In a vise as set forth in claim 10, said sliding jaw bracket being completely closed at its top surface to prevent fouling of the jaw shifting means by dirt and chips.

12. In a vise as set forth in claim 10, adjustable clamping means in the ring adapted to engage the swivel plate to prevent rotation of the latter; and said fixed jaw and first bracket overlapping the base ring and forming a secondary clamping means due to reaction of the clamping pressure binding the fixed jaw and first bracket down against the base ring, said reaction also drawing the shoulder of the swivel plate up against the shoulder of the base ring.

13. In a vise as set forth in claim 10, said first named bracket carrying a non-rotatable nut; and said means for shifting the sliding jaw comprising a screw shaft journaled in the sliding jaw bracket and engaging the said nut; said screw shaft having a wrench engaging extension projecting beyond the sliding jaw maintained at a constant requisite maximum.

14. In a vise as set forth in claim 10, said first named bracket having parallel guides; and said sliding jaw bracket having cooperating guides engaging the first mentioned guides.

15. In a vise of the character specified, an annular base ring having an internal annular shoulder; a swivel plate within said base ring having an external annular shoulder engaging the shoulder of the ring; a fixed jaw on the swivel plate; a bracket on the swivel plate; said jaw and bracket overlapping the base ring and positioning the swivel plate in the ring while permitting free rotation of the plate therein; a sliding jaw slidably mounted on the bracket, said sliding jaw having projections carrying heads entering parallel T-slots in the swivel plate to prevent lifting of the sliding jaw during clamping operations; adjustable clamping means in the ring adapted to engage the swivel plate to prevent rotation of the latter; and said overlapping of the ring by the fixed jaw and bracket forming a secondary clamping means due to reaction of the clamping pressure binding the fixed jaw and bracket down against the base ring, said reaction also drawing the shoulder of the swivel plate up against the shoulder of the base ring.

16. In a vise as set forth in claim 15, a sliding jaw bracket carrying the sliding jaw; and said first bracket carrying a non-rotatable nut; and a screw shaft journaled in the sliding jaw bracket and engaging the said nut.

17. In a vise as set forth in claim 15, a sliding jaw bracket carrying the sliding jaw; and said first bracket carrying a non-rotatable nut; and a screw shaft journaled in the sliding jaw bracket and engaging the said nut; said sliding jaw bracket being completely closed at its top surface to prevent fouling of the screw shaft by dirt or chips.

18. In a vise as set forth in claim 15, a sliding jaw bracket carrying the sliding jaw; and said first bracket carrying a non-rotatable nut; and a screw shaft journaled in the sliding jaw bracket and engaging the said nut; said first named bracket having parallel guides, and said sliding jaw bracket having cooperating guides engaging the first mentioned guides.

19. In a vise as set forth in claim 15, a sliding jaw bracket carrying the sliding jaw; and said first bracket carrying a non-rotatable nut; and a screw shaft journaled in the sliding jaw bracket and engaging the said nut; said screw shaft having a wrench engaging extension projecting beyond the sliding jaw bracket maintained at a constant requisite minimum.

ROBERT S. CONDON.
WILLIAM HARRY WILLIAMS.